United States Patent [19]
Iijima

[11] 3,930,555
[45] Jan. 6, 1976

[54] TRANSMISSION SHIFTING CONTROL SYSTEM

[75] Inventor: Tetsuya Iijima, Tokyo, Japan

[73] Assignee: Nissan Motor Company Limited, Yokoahama, Japan

[22] Filed: Dec. 23, 1974

[21] Appl. No.: 535,683

[30] Foreign Application Priority Data
Dec. 24, 1973  Japan............................. 48-143580

[52] U.S. Cl.............. 180/82 A; 180/82 C; 180/101; 307/10 SB; 340/52 E
[51] Int. Cl.²......................................... B60R 21/10
[58] Field of Search........ 180/82 A, 82 C, 101, 102, 180/103; 340/52 E, 52 F, 278; 307/10 SB; 200/61.58 B

[56] References Cited
UNITED STATES PATENTS

| | | | |
|---|---|---|---|
| 1,675,465 | 7/1928 | Rochrich | 340/52 F |
| 1,805,088 | 5/1931 | Hardesty | 180/82 A |
| 3,438,455 | 4/1969 | Redmond | 180/82 C |
| 3,729,059 | 4/1973 | Redmond | 180/82 C |
| 3,859,625 | 1/1975 | Eggert | 180/82 C X |
| 3,864,668 | 2/1975 | Bickford | 180/82 C X |
| 3,870,120 | 3/1975 | Blinkilde | 180/82 C |

*Primary Examiner*—Leo Friaglia
*Assistant Examiner*—Terrance L. Siemens

[57] ABSTRACT

A bistable memory circuit is set by a first output signal produced when the driver is absent from his seat of the vehicle to produce an output signal and is reset by a second output signal produced when the driver sits down on his seat but fails to carry out a precautionary safety procedure to protect him to cease to produce the output signal. An AND gate circuit produces an output signal only when an output signal produced when the driver sits down on his seat and the output signal of the bistable memory circuit are concurrently present. An OR gate circuit produces an output signal when at least one of the second output signal and the output signal of the AND gate circuit is present to energize a solenoid to render shifting of the transmission from a parking or neutral position into a driving gear impossible.

8 Claims, 5 Drawing Figures

1

TRANSMISSION SHIFTING CONTROL SYSTEM

The present invention relates generally to a motor vehicle transmission shifting control system and particularly to a system for rendering shifting of a motor vehicle transmission from a parking or neutral position into a driving gear impossible if the driver fails to carry out a precautionary safety procedure to protect himself such as fastening his seat belt to compel the driver to carry out the precautionary procedure before being able to drive the vehicle.

Motor vehicles are at present required by law in many countries to be equipped with seat belts. The purpose of this is to prevent the driver and occupant of the vehicle from being thrown forward from his seat in the event of a collision of the vehicle to protect the driver and occupant from injury in a collision with structural parts of the vehicle which is called the "second collision". However, many drivers and occupants fail to fasten the seat belts because of the troublesome steps or procedures required for fastening the seat belts and uncomfortable pressure on bodies of the occupants after fastening them. As a result, in fact seat belts are merely provided for use in motor vehicles but the vehicles are started and driven with the seat belts being unfastened by the occupants. Accordingly, it is necessary to inhibit starting of a motor vehicle if the driver fails to fasten his seat belt to compel the driver to fasten the seat belt before starting of the vehicle. In this instance, it is important to permit starting of an engine of the vehicle even if the driver does not fasten the seat belt. The purpose of this is to avoid the inconvenience that otherwise the seat belt fastened by the driver restrains movements required of him for performing manipulation and inspection of the engine and the vehicle for starting the engine.

It is, therefore, an object of the invention to provide a system for rendering shifting of a transmission of a motor vehicle from a parking or neutral position into a driving gear impossible if the driver fails to carry out a precautionary safety procedure or steps to protect him such as fastening the seat belt to compel the driver to carry out the precautionary safety procedure of steps before starting of the vehicle but in which system starting of an engine of the vehicle is possible without carrying out the precautionary safety procedure or steps.

It is a further object of the invention to provide a system for rendering shifting of a transmission of a motor vehicle from a parking or neutral position into a driving gear impossible even when the seat belt is in a condition in which members of the seat belt are engaged with each other although the driver fails to fasten the seat belt about himself.

These and other objects and advantages of the invention will become more apparent from the following detailed description taken in conjunction with the accompanying drawings in which.

Figure 1:
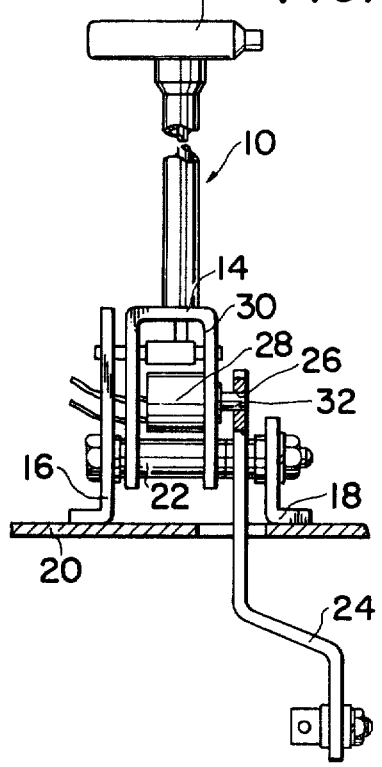
FIG. 1 is a schematic view, partly in cross section, of a part of a preferred embodiment of a transmission shifting control system according to the invention.
Figure 2:
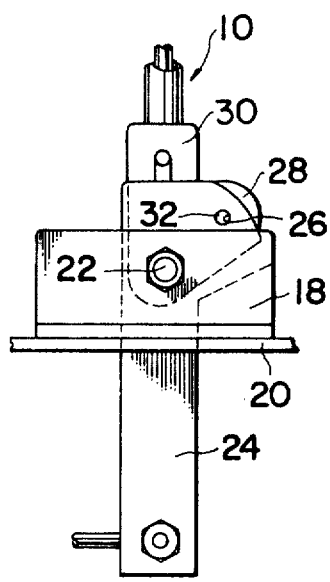
FIG. 2 is a schematic side view of the transmission shifting control system shown in FIG. 1.

Referring to FIGS. 1 and 2, a part of an automatic power transmission of a motor vehicle is shown to include a manually operated gear selector lever 10 which has a hand grip 12 at its upper end and a clevis 14 at its lower end. First and second brackets 16 and 18 spaced apart from each other are fixedly mounted on the floor 20 of the vehicle and rotatable support a shaft 22 to which the clevis 14 is fixedly secured. The selector lever 10 is swingable around the axis of the shaft 22 by manipulating the hand grip 12 and has its angular positions P (parking), R (reverse), N (neutral), D (automatically shifting forward driving gear ratios), 2 (two-way 2nd gear) and 1 (two-way 1st gear). The selector lever 10 serves as one portion of a shift linkage of the transmission. A linking lever 24 is pivotably mounted on the shaft 22 and extends to a manual selector valve of a hydraulic control system (not shown) of the transmission. The linking lever 24 serves as the other portion of the shift linkage. The linking lever 24 is formed therein with a recess 26 such as an aperture or hole. A solenoid 28 is fixedly mounted on an inner surface of the wall 30 of the clevis 14 and has a projection 32 which extends from a core (not shown) of the solenoid 28 and which is engageable with the recess 26 of the linking lever 24. The projection 32 is in a protruded position shown in FIG. 1 in which it engages the recess 26 when the solenoid 28 is deenergized, and is retracted disengaging the recess 26 when the solenoid 28 is energized. When the projection 32 engages the recess 26, the selector lever 20 is connected with the linking lever 24 so that swinging movement of the selector lever 10 causes shifting of the transmission. When the projection 32 disengages the recess 26, the selector lever 10 is disconnected from the linking lever 24 to render shifting of the transmission impossible.

Figure 3:
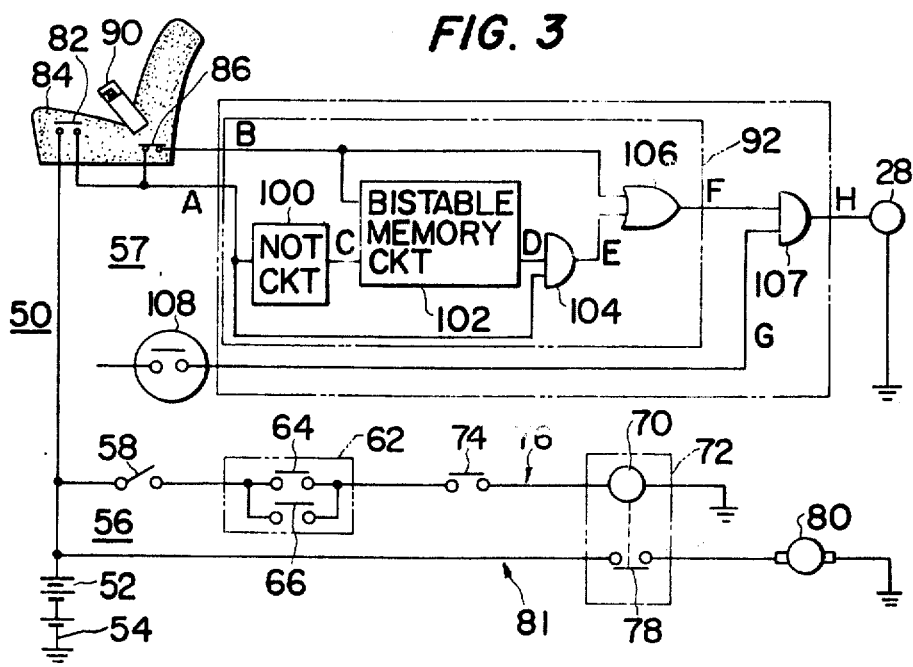
FIG. 3 is a circuit diagram of a first preferred embodiment of an electric control circuit forming a part of a transmission shifting control system according to the invention.

Referring to FIG. 3, an electric control circuit 50 forming a part of the transmission shifting control system according to the invention is shown to comprise a d.c. power source such as a battery 52 of the vehicle the negative terminal of which is grounded through a line 54. The electric control circuit 50 comprises also an engine starting control circuit 56 which controls starting of an engine (not shown) of the vehicle and a transmission shifting control circuit 57 which controls the solenoid 28. The engine starting control circuit 56 comprises an ignition switch 58 which is connected with the positive terminal of the power source 52. The ignition switch 58 is normally open and is closed for producing a spark in a combustion chamber (not shown) of the engine. The ignition switch 58 is connected in series with a parallel connection or section 62 of a parking switch 64 and a neutral switch 66. The parking switch 64 is normally open and closed when the manual selector lever 10 is in its parking position P. The neutral switch 66 is normally open and closed when the manual selector lever 10 is in its neutral position N. The parallel section 62 of the parking and neutral switches 64 and 66 is connected with starter relay coil 70 of a starter relay 72 through a starter switch 74. The starter switch 74 is normally open and manually closed for starting the engine. One terminal of the relay coil 70 is grounded. The relay coil 70 is energized when the switch 58, one of the switches 64 and 66, and the switch 74 are closed. The switch 58, parallel section 62, switch 74 and relay coil 70 form a starter motor control circuit 76. The engine starting control circuit 56 also comprises a starter relay switch 78 of the starter relay 72. The relay switch 78 is connected with the positive terminal of the power source 52 and with a starter motor 80. The relay switch 78 is normally open and closed when the relay coil 70 is energized to operate the starter motor 80 to start the engine. One terminal of the coil (not shown) of the starter motor 80 is grounded. The switch 78 and starter motor 80 form a starter motor circuit 81. It will be understood that the engine can be started only when the selector lever 10 and accordingly also the transmission are in the parking or neutral position P or N.

The transmission shifting control circuit 57 comprises a switch 82 which is connected with the positive terminal of the power source 52. The switch 82 is normally open and closed to produce an output signal A when the driver (not shown) of the vehicle sits down on his seat 84. The switch 82 is connected in series with a switch 86 which is closed when the driver fails to carry out a precautionary safety procedure or steps for protecting the driver such as fastening a seat belt 90 which is equipped in the vehicle to encircle the driver to restrain him for his protection and safety, or rendering or maintaining a driver restraining device of the passive or automatic type operative or effective which type is automatically fastened to the driver when the driver sits down on his seat and concurrently when the device is operative. The switch 86 produces an output signal B when closed with the switch 82 closed. The switch 86 is opened when the driver carries out the precautionary safety procedure or steps. The switches 82 and 86 are connected with a failure detecting circuit which is generally designated by the reference numeral 92. The failure detecting circuit 92 comprises a NOT circuit 100 to which the output signal A of the switch 82 is applied. The NOT circuit 100 produces no output signal when the output signal A of the switch 82 is present and produces an output signal C when the output signal A of the switch 82 is absent. The output signal C of the NOT circuit 100 is applied to a bistable memory circuit 102 to which the output signal B of the switch 86 is also applied. The bistable memory circuit 102 is set by the output signal C of the NOT circuit 100 to produce an output signal D and is reset by the output signal B of the switch 86 to cease to produce the output signal D. The output signal D of the bistable memory circuit 102 is applied to an AND gate logic circuit 104 to which the output signal A of the switch 82 is also applied. The AND gate circuit 104 produces an output signal E only when the output signal A of the switch 82 and the output signal D of the bistable memory circuit 102 are concurrently present. The output signal E of the AND gate circuit 104 is applied to an OR gate logic circuit 106 to which the output signal B of the switch 86 is also applied. The OR gate circuit 106 produces an output signal F when only one of the output signal B of the switch 86 and the output signal E of the AND gate circuit 104 is present. The output signal F of the OR gate circuit 106 is applied to an AND gate logic circuit 107 which is connected with the solenoid 28. A sensor 108 is provided which is responsive to operation of the engine to produce an output signal G. The sensor 108 may, for example, be an engine speed sensor which generates an output signal representing the engine speed. One terminal of the sensor 108 is grounded. The output signal G of the sensor 108 is applied to the AND gate circuit 107. The AND gate circuit 107 produces an output signal H only when the output signal F of the OR gate circuit 106 and the output signal G of the sensor 108 are concurrently present. The output signal H of the AND gate circuit 107 is applied to the solenoid 28 to energize the same to disconnect the selector lever 10 from the linking lever 24 to render shifting of the transmission from the parking or neutral position P or N into a driving gear impossible.

The operation of the transmission shifting control system according to the invention thus arranged is as follows.

When the driver does not enter the vehicle, the switch 82 is open and the switch 86 is closed so that no output signals A and B are produced and the NOT circuit 100 produces the output signal C. The bistable memory circuit 102 is set by the output signal C to provide the output signal D which is applied to the AND gate circuit 104. Since the output signal A is absent, the AND gate circuit 104 produces no output signal E. Since the output signals B and E are absent, the OR gate circuit 106 produces no output signal F. Thus, the solenoid 28 is de-energized so that the manual selector lever 10 is connected with the linking lever 24 and accordingly the transmission is shiftable from the parking or neutral position P or N to a driving gear.

When the driver sits down on his seat 84 but fails to carry out the precautionary safety procedure or steps, the switch 82 is closed so that the output signals A and B are produced and the NOT circuit 100 produces no output signal C. The bistable memory circuit 102 is reset by the output signal B of the switch 86 to cease to produce the output signal D. As a result, the AND gate circuit 104 produces no output signal E. Since the output signal B of the switch 86 is present, the OR gate circuit 106 produces the output signal F which is applied to the AND gate circuit 107. On the other hand, when the ignition and starter switches 58 and 74 are closed with the selector lever 10 being in the parking or neutral position P or N, the relay coil 70 is energized to close the relay switch 78 so that the starter motor 80 is operated to start the engine. Starting of the engine causes the sensor 108 to produce the output signal G which is applied to the AND gate circuit 107. Thus, the AND gate circuit 107 produces the output signal H so that the solenoid 28 is energized to disconnect the manual selector lever 10 from the linking lever 24 to render shifting of the transmission from its parking or neutral position P or N into a driving gear impossible. Accordingly, it is impossible to start the vehicle. At this time, if the selector lever 10 has been previously in one of the positions R, D, 2 and 1, the engine is prevented from being started and therefore starting of the vehicle is impossible.

In this condition, when the driver carries out the precautionary safety procedure or steps, the switch 86 is opened so that no output signal B is produced. Since the output signals B and E are absent, the OR gate circuit 106 produces no output signal F. Thus, the solenoid 28 is de-energized so that the selector lever 10 is connected with the linking lever 24 to allow the transmission to be shifted from the parking or neutral position P or N to a driving gear. In this state, if the driver ceases to carry out the precautionary safety procedure or steps, the switch 86 is closed so that the output signal B is produced. As a result, the OR gate circuit 106 produces the output signal F and then the AND gate circuit 107 produces the output signal H which is applied to the solenoid 28. Thus, the solenoid 28 is energized to disconnect the selector lever 10 from the linking lever 24 to render shifting of the transmission from the parking or neutral position P or N into a driving gear impossible.

When the driver does not take his seat in the vehicle and the seat belt 90 is in a condition in which component elements of the seat belt 90 are engaged with each other as if the driver fastens the seat belt 90, the switches 82 and 86 are opened so that no output signals A and B are produced. As a result, since the NOT circuit 100 produces the output signal C, the bistable memory circuit 102 is set by the output signal C to produce the output signal D. However, since the output signal A is absent, the AND gate circuit 104 produces no output signal E. Since the output signals B and E are absent, the OR gate circuit 106 produces no output signal F. Thus, the solenoid 28 is de-energized.

In this state, when the driver sits down on his seat, the switch 82 is closed with the switch 86 open so that the output signal A is produced and the output signal B remains absent. As a result, the NOT circuit 100 produces no output signal C and the bistable memory circuit 102 continues to produce the output signal D. Since the output signals A and D are present, the AND gate circuit 104 produces the output signal E. Accordingly, the OR gate circuit 106 produces the output signal F and then the AND gate circuit 107 produces the output signal H. Thus, the solenoid 28 is energized so that the selector lever 10 is disconnected from the linking lever 24 to render shifting of the transmission from the parking or neutral position P or N into a driving gear impossible.

In this state, when the drive disengages the component elements of the seat belt 90 from each other, the switch 86 is closed so that the output signal B is produced. The bistable memory circuit 102 is reset by the output signal B to cease to produce the output signal D. Therefore, the AND gate circuit 104 produces no output signal E. Since the output signal B is present, the OR gate circuit 106 produces the output signal F. Accordingly, the AND gate circuit 107 produces the output signal H. Thus, the solenoid 28 remains energized.

In this state, when the driver fastens the seat belt 90, the switch 86 is opened so that no output signal B is produced. As a result, the OR gate circuit 106 produces no output signal F. Accordingly, the AND gate circuit 107 does not produce the output signal H. Thus, the solenoid 28 is de-energized to allow shifting of the transmission from the parking or neutral position P or N into a driving gear.

When the driver unseats from his seat 84 and continues to carry out the precautionary safety procedure or steps, the switch 82 is opened so that no output signal A is produced. Accordingly, the NOT circuit 100 produces the output signal C. The bistable memory circuit 102 is set by the output signal C to provide the output signal D.

In this state, when the driver sits down on his seat 84, the switch 82 is closed so that the output signal A is produced. Therefore, the NOT circuit 100 produces no output signal C and the bistable memory circuit 102 continues to produce the output signal D. Since the output signals A and D are present, the AND gate circuit 104 produces the output signal E. Accordingly, the OR gate circuit 106 produces the output signal F. As a result, the AND gate circuit 107 produces the output signal H to energize the solenoid 28.

In this state, when the driver ceases to carry out the precautionary safety procedure or steps, the switch 86 is closed so that the output signal B is poduced. The bistable memory circuit 102 is reset by the output signal B to cease to produce the output signal D and the OR gate circuit 106 produces the output signal F. Thus, the solenoid 28 remains energized.

In this state, when the driver carries out the precautional safety procedure or steps, the switch 86 is opened so that no output signal B is produced. Accordingly, the OR gate circuit 106 produces no output signal F. Thus, the solenoid 28 is de-energized to allow shifting of the transmission from the parking or neutral position P or N into a driving gear.

Figure 4:
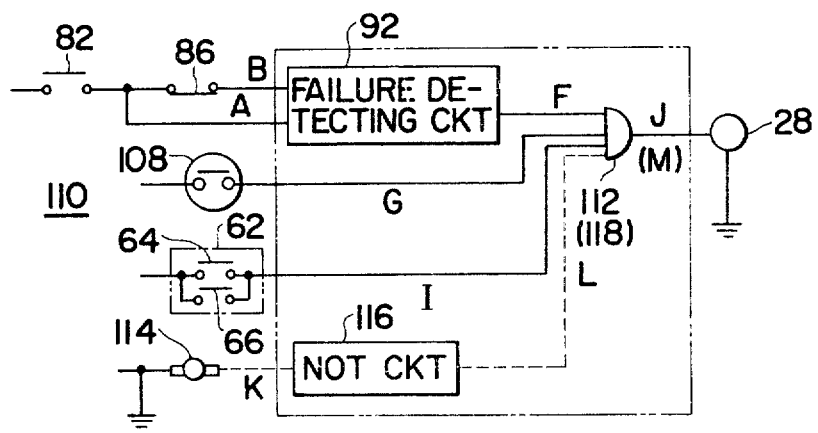
FIG. 4 is a circuit diagram of a second preferred embodiment of a transmission shifting control circuit forming a part of the electric control circuit shown in FIG. 3.

FIG. 4 illustrates a second embodiment of a transmissioon shifting control circuit forming a part of a transmission shifting control system according to the invention. As shown in FIG. 4, the transmission shifting control circuit 110 is different from the transmission shifting control circuit 57 shown in FIG. 3 in that it additionally comprises the parallel section or connection 62 of the parking and neutral switches 64 and 66 which have been described above with reference to and shown in FIG. 3 in addition to the switches 82 and 86, the failure detecting circuit 92 and the sensor 108 which have been described above with reference to and shown in FIG. 3 and an AND gate logic circuit 112 in lieu of the AND gate circuit 107 shown in FIG. 3. The parallel section 62 produces an output signal I when one of the parking and neutral switches 64 and 66 is closed. The output signal I of the parallel section 62 is applied to the ANd gate circuit 112. The AND gate circuit 112 produces an output signal J only when the output signal F of the OR gate circuit 106 of the failure detecting circuit 92, the output signal G of the sensor 108 and the output signal I of the parallel section 62 are concurrently present. The output signal J of the AND gate circuit 112 is applied to the solenoid 28 to energize the same to disconnect the selector lever 10 from the linking lever 24. Thus, the danger is avoided that the selector lever 10 is disconnected from the linking lever 24 when the transmission is in a driving gear such as the position R, D, 2 or 1, in other words, that the vehicle is started when shifting of the transmission is rendered impossible.

The transmission shifting control circuit 110 may comprise a sensor 114 which senses the vehicle speed to produce an output signal K and a NOT circuit 116 to which the output signal K of the sensor 114 is applied as shown by the broken lines in FIG. 4. One terminal of the sensor 114 is grounded. The NOT circuit 116 produces no output signal when the output signal K of the sensor 114 is present, that is, when the vehicle runs and which produces an output signal L when the output signal K of the sensor 114 is absent, that is, when the vehicle stops. The output signal L of the NOT circuit 116 is applied to an AND gate logic circuit designated by the reference numeral 118 which is parenthesized. The AND gate circuit 118 produces an output signal M which is parenthesized only when the output signals F, G, I and L are concurrently present. The output signal M of the AND gate circuit 118 is applied to the solenoid 28 to energize the same. Thus, even if the drivers erroneously or unintentionally ce ceases to carry out the precautionary safety procedure or steps and shifts the selector lever 10 into the parking or neutral position P or N during running of the vehicle, the danger is avoided that the selector lever 10 is disconnected from the linking lever 24 to render shifting of the selector lever 10 from the parking or neutral position P or N into a driving gear impossible.

Figure 5:
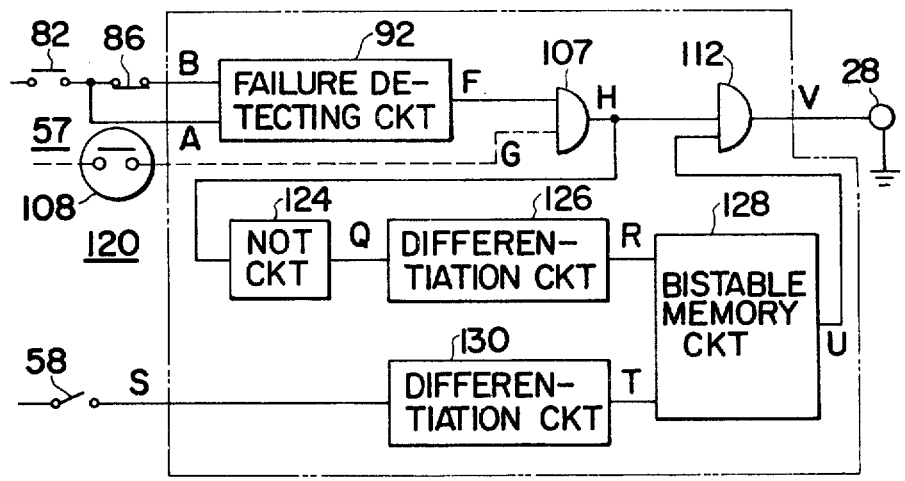
FIG. 5 is a circuit diagram of a third preferred embodiment of a transmission shifting control circuit forming a part of the electric control circuit shown in FIG. 3.

FIG. 5 illustrates a third embodiment of a transmission shifting control circuit forming a part of a transmission shifting control system according to the invention. As shown in FIG. 5, the transmission shifting control circuit 120 comprises the transmission shifting control circuit 110 as described above with reference to and shown in FIG. 3. The output signal H of the AND gate circuit 107 is applied to an AND gate logic circuit 122 which is connected with the solenoid 28. The output signal H of the AND gate circuit 107 is also applied to a NOT circuit 124. The NOT circuit 124 produces no output signal when the output signal H is present but produces an output signal Q when the output signal H is absent. The output signal Q of the NOT circuit 124 is applied to a differentiation circuit 126. The output signal Q received by the differentiation circuit 126 is converted thereby into an output signal R which represents the differentiation of the output signal Q. If desired, the differentiation circuit 126 can be omitted. The output signal R of the differentiation circuit 126 is applied to a bistable memory circuit 128. The ignition switch 58 which forms a part of the engine starting control circuit 56 are described above with reference to and shown in FIG. 3 is connected with a differentiation circuit 130 and applies an output signal S thereto when closed. The output signal S received by the differentiation circuit 130 is converted thereby into an output signal T which represents the differentiation of the output signal S. If desired, the differentiation circuit 130 can be omitted. The output signal T of the differentiation circuit 130 is applied to the bistable memory circuit 128. The bistable memory circuit 128 is set by the output signal T of the ignition switch 58 to produce an output signal U and is reset by the output signal R of the differentiation circuit 130 to cease to produce the output signal U. The output signal U is applied to the AND gate circuit 122 which produces an output signal V only when the output signal F of the failure detecting circuit 92 and the output signal U of the bistable memory circuit 128 are concurrently present. The output signal V of the AND gate circuit 122 is applied to the solenoid 28 to energize the same.

The operation of a transmission shifting control system comprising the transmission shifting control circuit 120 thus constructed is as follows:

When the driver sits down on his seat 84 but fails to carry out the precautionary safety procedure or steps, the failure detecting circuit 92 produces the output signal F as described hereinbefore. The output signal F is applied to the AND gate circuit 122 and concurrently to the NOT circuit 124. Therefore, the NOT circuit 124 produces no output signal Q. In this state, when the ignition switch 58 is closed, the output signal S is produced. The differentiation circuit 130 receives the output signal S and converts it into the output signal T which is applied to the bistable memory circuit 128. The bistable memory circuit 128 is set by the output signal T to produce the output signal U which is applied to the AND gate circuit 122. Accordingly, the AND gate circuit 122 produces the output signal V. Thus, the solenoid 28 is energized to disconnect the selector lever 10 from the linking lever 24 to render shifting of the transmission from the parking or neutral position P or N into a driving gear impossible.

In this state, when the driver carries out the precautionary safety procedure or steps, the failure detecting circuit 92 produces no output signal F as described hereinbefore. As a result, the AND gate circuit 122 produces no output signal V. Thus, the solenoid 28 is de-energized to allow shifting of the transmission from the parking or neutral position P or N into a driving gear. In this instance, since the output signal F of the failure detecting circuit 92 is absent, the NOT circuit 124 produces the output signal Q. The differentiation circuit 126 receives the output signal Q and produces the output signal R. The bistable memory circuit 128 is reset by the output signal R to cease to produce the output signal U. As a result, even if the driver ceases to carry out the precautionary safety procedure or steps so that the failure detecting circuit 92 produces the output signal F, since the bistable memory circuit 128 produces no output signal U, the solenoid 28 remains de-energized. This means that when the ignition switch 58 is closed but the driver fails to carry out the precautionary safety procedure or steps, the selector lever 10 is disconnected from the linking 24 to render shifting of the transmission from the parking or neutral position P or N into a driving gear impossible. As a result, the driver inevitably carries out the precautionary safety procedure or steps. However, when the driver ceases to carry out the precautionary safety procedure or steps with the ignition switch 58 closed, the selector lever 10 is prevented from being disconnected from the linking lever 24. In other words, the possibility or danger is avoided that the selector lever 10 is disconnected from the linking lever 24 to render shifting of the transmission impossible, even if the driver ceases to carry out the precautionary safety procedure or steps during running of the vehicle.

It will be appreciated that electrically operated means disconnects two portions of a shift linkage of a transmission of a motor vehicle from each other to render shifting of the transmission from a parking or neutral position into a driving gear impossible if the driver fails to carry out a precautionary safety procedure to protect him such as fastening the seat belt to force him to carry out the precautionary safety procedure before driving of the vehicle, by employing two switches, a NOT circuit, a bistable memory circuit, an AND gate circuit, an OR gate circuit and a solenoid.

It will be appreciated that the two sections of the shift linkage are disconnected from each other to render shifting of the transmission from a parking or neutral position into a driving gear impossible even when the seat belt is in a condition in which members of the seat belt are engaged with each other although the driver fails to fasten the seat belt around himself.

It will be appreciated that manipulation and inspection of the motor vehicle for starting the engine thereof is possible without carrying out the precautionary safety procedure.

Although the invention has been described as being applied to a transmission of an automatic shift type, the invention can also be applied to a transmission of a manual shift type.

What is claimed is:

1. A transmission shifting control system for a motor vehicle, comprising electrically operated means movable between a first position to connect two sections of a shift linkage of a transmission of the vehicle to allow shifting of said transmission and a second position to disconnect said two sections of said shift linkage from each other to inhibit shifting of said transmission, first sensing means sensing that the driver sits down on his seat of the vehicle to produce a first output signal and sensing that the driver is absent from his seat to produce a second output signal, second sensing means sensing that the driver fails to carry out a precautionary procedure for his safety and protection when said first sensing means produces said first output signal to produce an output signal, and an electric control circuit connect to said first and second sensing means and to said electric operated means and responsive to said output signal of said second sensing means to produce an output signal to move said electrically operated means from said first position into said second position to inhibit shifting of said transmission.

2. A transmission shifting control system as claimed in claim 1, in which said electric control circuit comprises a failure detecting circuit comprising a first bistable memory circuit which is set by said second output signal of said first sensing means to produce an output signal and which is reset by said output signal of said second sensing means to cease to produce said output signal, a first AND gate circuit for producing an output signal only when said first output signal of said first sensing means and said output signal of said bistable memory circuit are concurrently present, and an OR gate circuit for producing an output signal when only one of said output signal of said second sensing means and said output signal of said AND gate circuit is present, said electrically operated means being moved from said first position into said second position to disconnect said two sections of said shift linkage from each other to inhibit shifting of said transmission when said output signal of said OR gate circuit is present.

3. A transmission shifting control system as claimed in claim 2, in which said first sensing means comprises a switch which is normally open and closed to produce said first output signal when the driver sits down on his seat, and a NOT circuit which produces said second output signal when said first output signal is absent and said second sensing means comprises a switch which is normally closed to produce said output signal and opened when the driver carries out said precautionary procedure.

4. A transmission shifting control system as claimed in claim 2, in which said electric control circuit further comprises a sensor responsive to vehicle engine speed to produce an output signal and a second AND gate circuit for producing an output signal only when said output signal of said OR gate circuit and said output signal of said sensor are concurrently present, said electrically operated means being moved from said first position to said second position to disconnect said two sections of said shift linkage from each other when said output signal of said second AND gate circuit is present.

5. A transmission shifting control system as claimed in claim 2, in which said electric control circuit further comprises a sensor responsive to vehicle engine speed to produce an output signal, a parallel connection of a parking switch and a neutral switch, said parking switch being closed to produce an output signal only when a gear selector lever of said transmission is in a parking position, said neutral switch being closed to produce an output signal only when said gear selector lever is in a neutral position, and a second AND gate circuit for producing an output signal only when said output signal of said OR gate circuit, said output signal of said sensor and said output signal of said parallel connection are concurrently present, said electrically operated means being moved from said first position to said second position to disconnect said two sections of said shift linkage from each other to inhibit shifting of said transmission when said output signal of said second AND gate circuit is present.

6. A transmission shifting control system as claimed in claim 2, in which said electric control circuit further comprises a first sensor responsive to the vehicle engine speed to produce an output signal, a parallel connection of a parking switch and a neutral switch, said parking switch being closed to produce an output signal only when a gear selector lever of said transmission is in a parking position, said neutral switch being closed to produce an output signal only when said gear selector lever is in a neutral position, a second sensor responsive to vehicle speed to produce an output signal, a NOT circuit for producing an output signal only when said output signal of said second sensor is absent, and a second AND gate circuit for producing an output signal only when said output signal of said OR gate circuit, said output signal of said first sensor, said output signal of said parallel connection and said output signal of said NOT circuit are concurrently present, said electrically operated means being moved from said first position to said second position to disconnect said two sections of said shift linkage from each other to inhibit shifting of said transmission when said output signal of said second AND gate circuit is present.

7. A transmission shifting control system as claimed in claim 4, in which said electric control circuit further comprises a NOT circuit for producing an output signal when said output signal of said second AND gate circuit is absent, and a second bistable memory circuit which is set by an output signal produced by closing of an ignition switch of the vehicle to produce an output signal and which is reset by said output signal of said NOT circuit to cease to produce said output signal, and a third AND gate circuit for producing an output signal only when said output signal of said second AND gate circuit and said output signal of said second bistable memory circuit are concurrently present, said electrically operated means being moved from said first position into said second position to disconnect said two sections of said shift linkage from each other to inhibit shifting of said transmission when said output signal of said third AND gate circuit is present.

8. A transmission shifting control system as claimed in claim 2, in which said electrically operated means comprises a solenoid which is fixedly mounted on a gear selected lever forming one of said two sections of said shift linkage and which has a projection extending from a core of said solenoid, and a linking lever which forms the other of said two sections of said shift linkage and which is formed therein with a recess, said projection engaging said recess to connect said gear selector lever and said linking lever to allow shifting of said transmission when it is in said first position, said solenoid being energized to move said projection from said first position into said second position to disconnect said gear selector lever from said linking lever to inhibit shifting of said transmission when said output signal of said OR gate circuit is present.

\* \* \* \* \*